May 20, 1958 F. J. WILLIAMS 2,835,161
OPTOMETRICAL APPARATUS
Filed April 30, 1954 3 Sheets-Sheet 1

Inventor:
Frank J. Williams
By: Wallace and Cannon
Attorneys

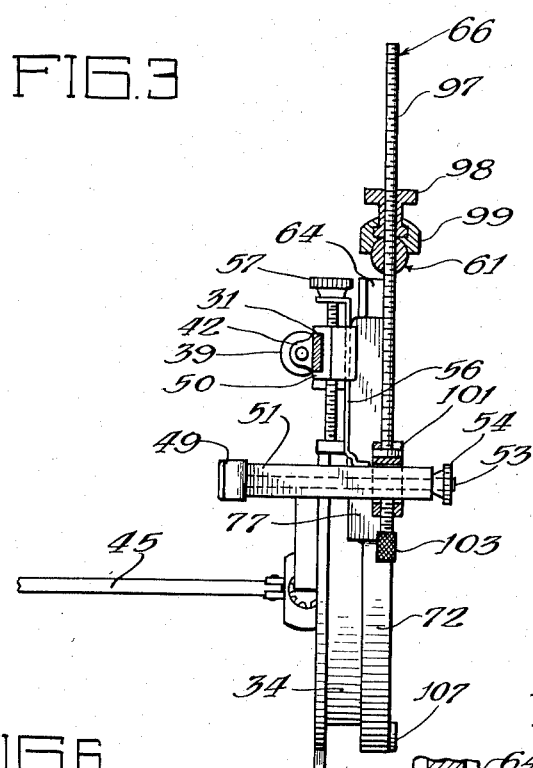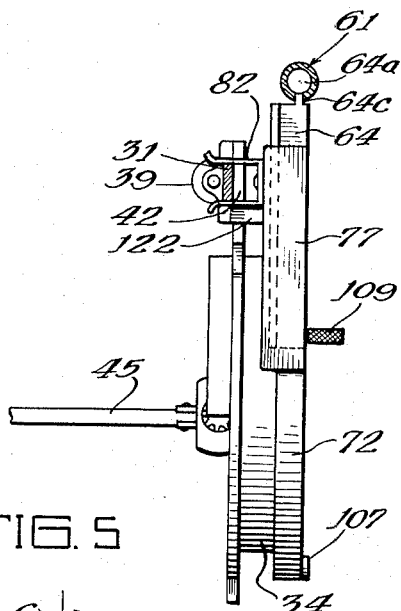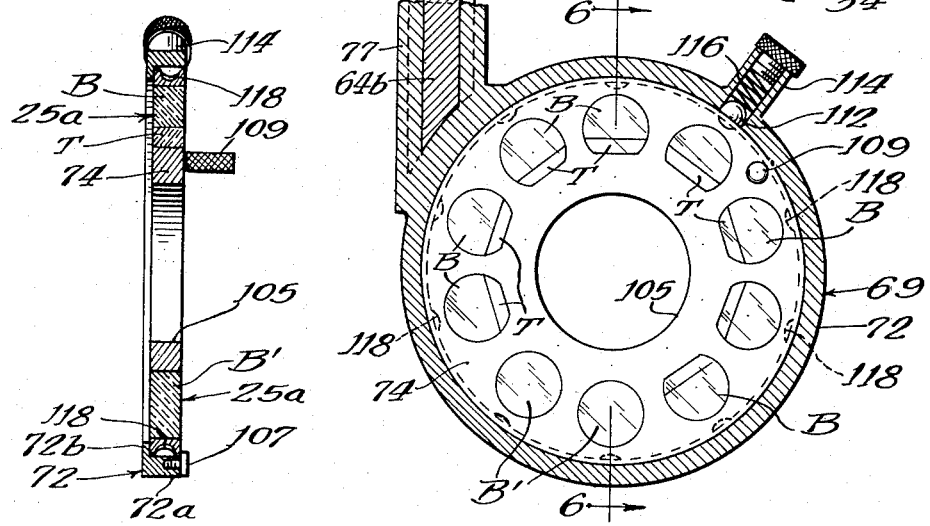

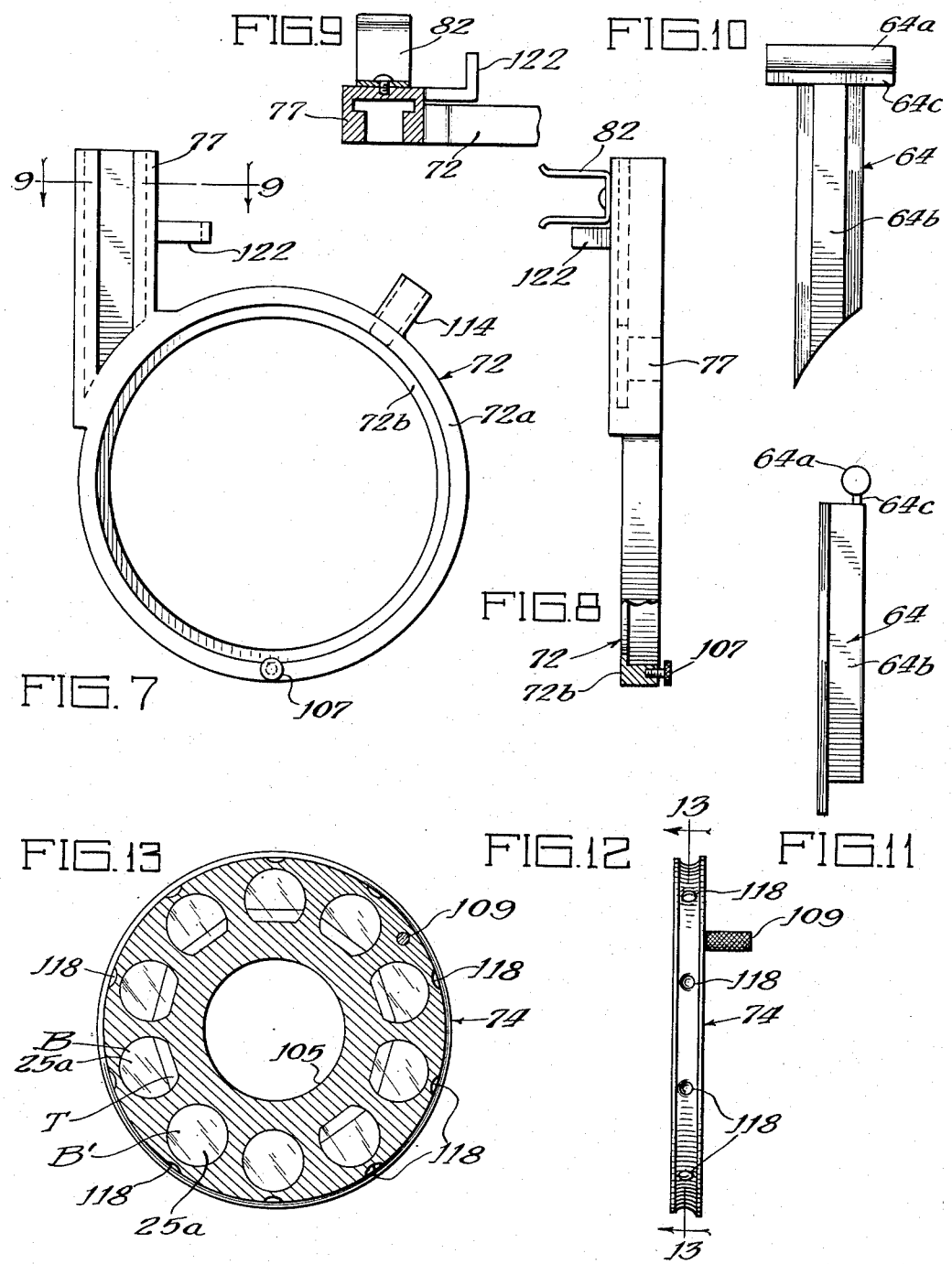

United States Patent Office 2,835,161
Patented May 20, 1958

2,835,161

OPTOMETRICAL APPARATUS

Frank J. Williams, Waukegan, Ill., assignor of one-half to Charles E. Jack, Waukegan, Ill.

Application April 30, 1954, Serial No. 426,755

5 Claims. (Cl. 88—20)

This invention relates to optometrical apparatus and more specifically to such apparatus which is particularly well adapted for demonstrating to a patient during an eye examination the advantages of bifocal and trifocal lenses.

As is well known in the art, spectacles or "eye glasses" wherein each lens comprises what is termed a "single vision lens" for the purpose of correcting such eye abnormalities or defects as astigmatism, myopia, hypermetropia, and the like, are quite common, and for the purposes of this description such lenses shall be hereinafter referred to as "corrective lenses." However, spectacles embodying not only such corrective lenses but also embodying additional lenses such as, for example, bifocal and trifocal lenses, are also quite common. The purpose of such multiple-lens spectacles, is, of course, to give correction, and assistance, to the eye in viewing objects at various distances. Thus, for example, with a person wearing bifocal spectacles, the "glass" or lens disposed in front of each eye is, in fact, a multiple lens, with the major portion of the lens, and especially the upper portion thereof, normally comprising one of the aforementioned corrective lenses, and with a bifocal lens mounted in the lower portion of the corrective lens as an integral part thereof. With this arrangement it will be seen that when a person is looking substantially straight ahead through such spectacles, as is normal when looking at distant objects, the person looks through the upper or corrective lens portion of the lenses, but when the person is looking downwardly in the direction in which he normally looks when reading a document held in his hands, he looks through the so-called bifocal, or reading, lens.

Trifocal lenses are, of course, merely bifocal lenses with a third lens added thereto. This third lens is looked through by the person wearing trifocal spectacles when looking at objects disposed at distances intermediate the distances for which he uses the corrective lens portion and the bifocal lens portion of the spectacles, such as, for example, when looking at documents on the other side of a desk. or looking at cards lying on the other side of a card-table. Such trifocal lenses are normally disposed in the horizontal center of the "glass" of a pair of spectacles, below the vertical center thereof and above the bifocal lens portion thereof.

For the purposes of the present description, the aforementioned single vision lenses will be hereinafter referred to as "corrective lenses," and the bifocal and trifocal lenses, whether used alone or together, will hereinafter be referred to as "auxiliary lenses."

Also, for the purpose of simplifying reference to the manner, or direction, in which a person wearing spectacles is looking in the following description, the normal direction in which a person looks through spectacles when looking off in the distance will hereinafter be referred to as "distance-looking direction"; the direction in which a person normally looks in looking through a bifocal lens in reading a book, or the like, will hereinafter be referred to as "reading direction"; and the direction in which a person normally looks when looking through a trifocal lens will hereinafter be referred to as an "intermediate direction."

Various forms of trial frames or testing frames, wherein single vision lenses are disposed in position in front of the eye of a patient having his eyes examined, have heretofore been known in the art. Insofar as I know, no one prior to my invention has ever afforded a practical optometrical apparatus which may be effectively used to demonstrate to a patient during an eye examination the advantages, and the effect accomplished, of using bifocal, trifocal, or a combination of bifocal and trifocal, lenses in conjunction with single vision lenses which the patient would use if he were not using bifocal or trifocal lenses. It is the primary object of my invention to overcome this shortcoming and to afford novel optometrical apparatus by which it may be readily and effectively demonstrated to a patient during an eye examination the advantages, and the effect accomplished, by using bifocal, or trifocal lenses.

A further object of my invention is to afford novel optometrical apparatus for demonstrating the advantages and effect accomplished by bifocal and trifocal lenses, and which apparatus includes trial frames used for testing eyes with corrective lenses.

Another object of my invention is to enable auxiliary lenses to be quickly and easily mounted on and removed from such trial frames in a novel and expeditious manner.

Another object is to afford novel apparatus of the aforementioned character for holding such auxiliary lenses in operative position relative to such corrective lenses, which is readily adjustable laterally and vertically relative to such a trial frame and to the eyes of the wearer.

Yet another object of my invention is to afford a novel device of the aforementioned character by which various auxiliary lenses may be readily moved into proper position relative to the eyes of a patient without the necessity of individually handling the various lenses.

A further object of my invention is to afford a device of the aforementioned character wherein the lenses are readily rotatable to bring the proper lenses into the proper position before the eyes of a patient.

Another object of my invention is to afford a novel device of the aforementioned character which is efficient in operation and which may be readily and economically manufactured commercially.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 3 is a sectional view taken substantially along the line 3—3 in Fig. 1;

Fig. 4 is a sectional view taken substantially along the line 4—4 in Fig. 1;

Fig. 5 is a detail sectional view taken substantially along the line 5—5 in Fig. 2;

Fig. 6 is a detail sectional view taken substantially along the line 6—6 in Fig. 5;

Fig. 7 is a detail front elevational view similar to Fig. 5 with certain parts removed;

Fig. 8 is a side elevational view of the part of the device shown in Fig. 7 with certain parts broken away to show the internal construction thereof;

Fig. 9 is a detail sectional view taken substantially along the line 9—9 in Fig. 7;

Fig. 10 is an enlarged detail view of a portion of the device shown in Fig. 1;

Fig. 11 is a side elevational view of the portion of the device shown in Fig. 10;

Fig. 12 is a side elevational view of a portion of the device shown in Fig. 5; and Fig. 13 is a detail sectional view taken substantially along the line 13—13 in Fig. 12.

Figure 1:
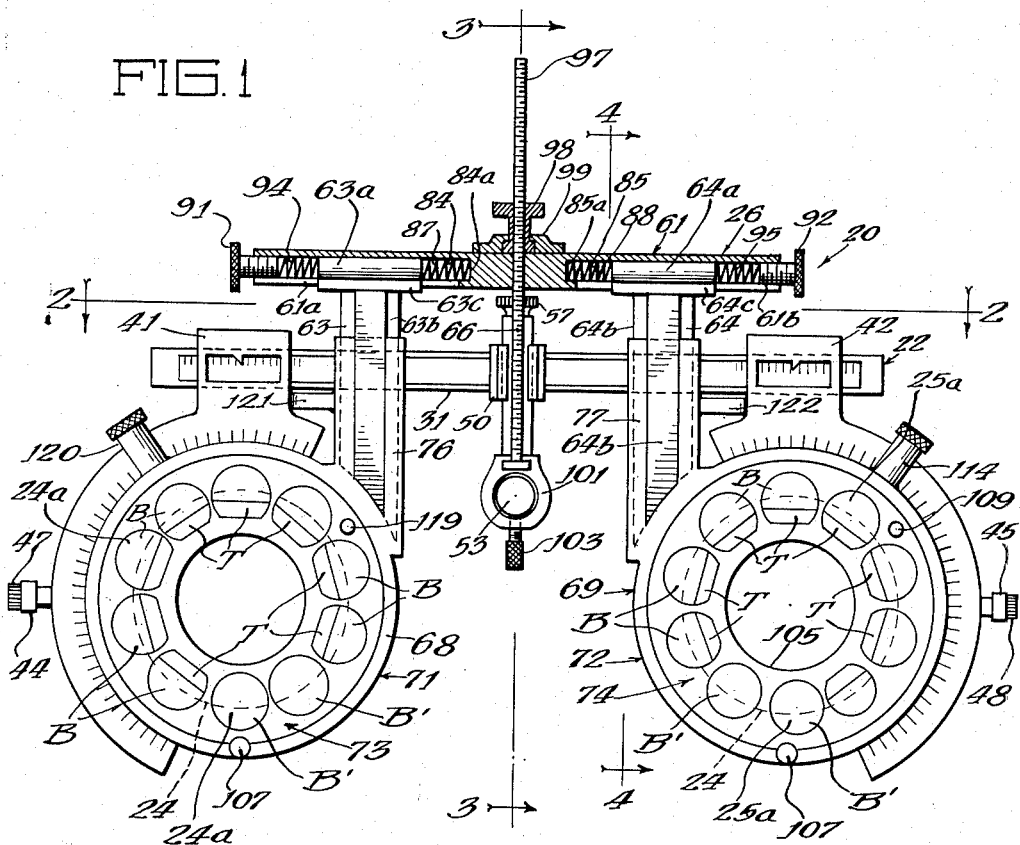
Fig. 1 is a front elevational view of an optometrical device embodying the principles of my invention.

An optometrical apparatus 20, embodying the principles of my invention, is shown in the accompanying drawings to illustrate the preferred embodiment of my invention. In general, the optometrical apparatus 20 comprises a trial frame 22 for holding corrective lenses 24 and 25, Fig. 2, and an auxiliary frame 26, Figs. 1 and 2, mounted on the trial frame 22 for holding auxiliary lenses 24a and 25a. The trial frame 22 is adapted to be mounted on the head of a patient whose eyes are being examined in position to support the corrective lenses 24 and 25, Fig. 2, in the position before the patient's eyes in which lenses of spectacles or eye glasses are normally worn, and this position of corective lenses such as lenses 24 and 25 will, for convenience, hereinafter be referred to as "spectacle-position."

The auxiliary frame 26, when disposed in operative position on the trial frame 22, is operable to mount the auxiliary lenses 24a and 25a forwardly of the lower portions of the corrective lenses 24 and 25 when the latter lenses are mounted in the trial frame 22.

Figure 2:
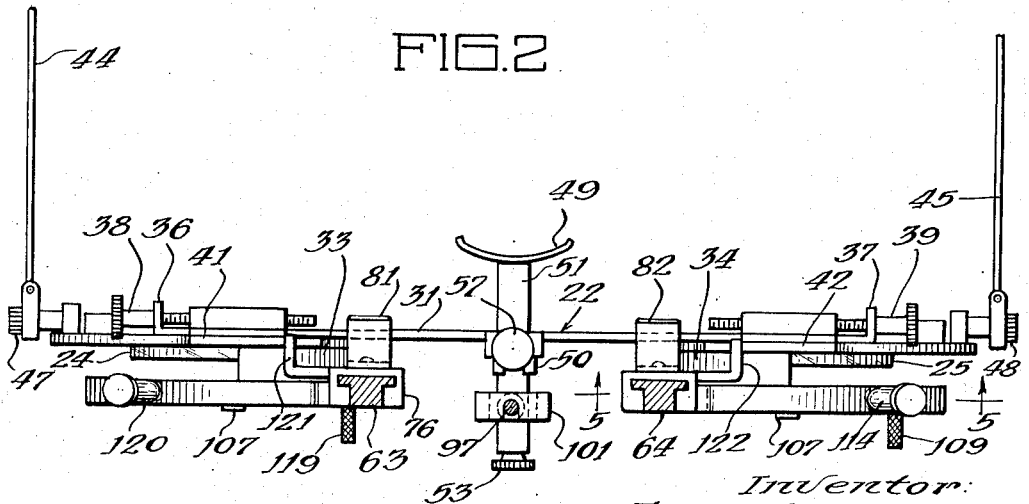
Fig. 2 is a sectional view taken substantially along the line 2—2 in Fig. 1.

The trial frame 22, Figs. 1 and 2, is of a construction heretofore well known in the art and forms no part of my invention except insofar as it forms part of a new and novel combination which embodies my invention. As is best seen in Figs. 1 and 2, the trial frame 22 comprises a cross member 31 on the opposite end portions of which are slidingly mounted two substantially arcuate shaped housings 33 and 34, into which the lenses 24 and 25 may be inserted to thereby hold the lenses 24 and 25 in spectacle-position on a patient wearing the trial frame 22. The opposite end portions 36 and 37 of the cross member 31 are offset inwardly, Fig. 2, and adjusting screws 38 and 39 are journaled in the end portions 36 and 37 respectively, and are threaded into bosses 41 and 42, respectively, which project from the housings 33 and 34. The bosses 41 and 42 are slidingly mounted on the cross member 31, Figs. 2 and 3, so that the bosses 41 and 42 and, therefore, the housings 33 and 34 may be adjusted inwardly and outwardly along the cross member 31 by rotation of the screws 38 and 39, respectively.

Two temples or bows 44 and 45 are mounted on the housings 33 and 34, respectively, by suitable mounting means such as screws 47 and 48 and are adapted to rest on the ears of a patient when the trial frame 22 is mounted in spectacle-position.

A bracket member 56 is slidingly mounted for vertical movement in a mounting bracket 50, Fig. 3, mounted on the longitudinal center portion of the cross member 31, and an adjusting screw 57 is mounted in the bracket 56 and the bracket 50 for effecting vertical adjustment of the bracket member 56 relative to the bracket 50 and the cross member 31. A nose piece 49 is mounted on a sleeve 51, Figs. 1, 2 and 3 by means of an adjusting screw 53 and a nut 54, and the sleeve 51 is mounted on the lower end portion of the adjustable bracket member 56. With this construction, the nose piece 49 may be adjusted laterally or horizontally by turning the nut 54 on the screw 53, and may be adjusted in a vertical direction relative to the cross member 31 by turning the screw 57.

Thus, it will be seen that, in the use of the trial frame 22, the housings 33 and 34 may be moved into proper position on the cross member 31 to dispose the corrective lenses 24 and 25 in proper spectacle-position, the temples 44 and 45 may then be disposed in position to extend along the sides of the head and behind the ears of the patient, and the nose piece 49 may then be adjusted vertically and horizontally by the screws 57 and 54, respectively, to accommodate the nose piece 49 to the individual patient, and when so properly adjusted the trial frame 22 is effective to support corrective lenses 24 and 25 in proper spectacle-position on the patient whose eyes are being examined.

Normally, when a person is fitted for bifocal or trifocal lenses the person is fitted for each individual lens, that is, if he is being fitted for trifocal lenses his eyes are tested for the proper corrective lenses to use, his eyes are then tested for the proper bifocal lens to use for reading purposes, and his eyes are again tested for the proper trifocal lens to use for the intermediate viewing. Tests for each of these lenses are of course, made individually. After these tests are made it has been the practice in the past to then make up the proper finished lenses for each eye of the patient, each such finished lens embodying the prescribed combination of corrective and auxiliary lenses, namely, the necessary corrective lens, the necessary bifocal lens, and the necessary trifocal lens. Using this procedure, if it is his first pair of bifocal or trifocal spectacles, the patent has never had such composite lenses demonstrated to him under anything resembling conditions in which he will be viewing objects with such compound lenses until the actual spectacle lenses embodying his corrections are made up. Of course, the making up of such lenses is relatively expensive, and therefore, if the patient, after they are made up, finds that they are unsatisfactory or that he doesn't like to use such lenses, such a discovery is not made until the expense of the lenses has already been incurred by the patient.

As far as I know, there has never been available in the art any successful practical device such as my novel invention, for demonstrating to such a patient the manner in which bifocal or trifocal lenses will operate prior to the construction of actual spectacle-type lenses. With my novel device, the patient who needs the correction or assistance obtained by bifocal lenses ar trifocal lenses may have such lenses demonstrated to him, in a novel, practical, and effective manner prior to the actual making up of finished lenses of the character which will be used in the finished spectacle furnished the patient.

In my novel device, the auxiliary frame 26 is mounted on the trial frame 22 in a novel and expeditious manner whereby auxiliary lenses having bifocal or trifocal corrections may be effectively mounted on the trial frame 22 in such position that a patient when wearing the novel optometrical apparatus 20 may look forwardly at a distance through corrective lenses such as lenses 24 and 25 in substantially the same manner as he would look through spectacles embodying such corrective lenses, and may look in a normal reading direction and a normal intermediate direction through bifocal and trifocal lenses, respectively, mounted forwardly of the corrective lenses 24 and 25 to thereby demonstrate to the patient the operation and effect of spectacles embodying the usual single vision lenses and auxiliary lenses.

The auxiliary frame 26, Figs. 1, 2 and 3, includes an elongated cross bar 61 from which depend two elongated substantially straight end legs 63 and 64 and an intermediate leg 66. Two lens-mounts 68 and 69 are mounted on the end legs 63 and 64, respectively, and the end legs 63 and 64 and the intermediate leg 66 are adjustable relative to the cross bar 61 so as to properly position the lens-mounts 68 and 69 in position relative to corrective lenses, such as the lenses 24 and 25, on the trial frame 22 so that a patient may look through the corrective lenses 24 and 25 and through the auxiliary lenses 24a and 25a in the lens-mounts 68 and 69 as will be discussed in greater detail presently.

Each of the lens-mounts 68 and 69 includes a substantially annular shaped housing 71 and 72, respectively, in which is rotatably mounted a disk 73 and 74, respectively. A substantially channel shaped boss 76 and 77 projects from the housing 71 and 72, respectively, and is slidingly mounted on the complementary shaped end legs 63 and 64 for movement longitudinally of the latter, Figs. 1, 2 and 5. Two spring clips 81 and 82, Figs. 2, 4 and 8, are mounted on the bosses 76 and 77, respectively, in position to clampingly engage the cross bar 31 on the trial frame 22.

The cross bar 61 of the auxiliary frame 26 is substantially circular in cross section, Fig. 4, and end legs 63 and 64 have elongated heads 63a and 64a on the upper ends thereof, respectively, which are substantially cylindrical in shape and are mounted in longitudinally extending chambers 84 and 85 formed in the cross bar 61. The heads 63a and 64a of the legs 63 and 64 are connected to the lower end portions or shanks 63b and 64b of the legs 63 and 64 by intermediate bars 63c and 64c, respectively, which are reduced in cross section and extend outwardly, through slots 61a and 61b, respectively, in the cross bar 61, Figs. 1 and 4.

Two compression coil springs 87 and 88 are mounted in chambers 84 and 85, respectively, between the inner end walls 84a and 85a of the chambers 84 and 85 and the adjacent heads 63a and 64a and yieldingly urge the legs 63 and 64 outwardly away from each other in the cross bars 61. The outward movement of the legs 63 and 64 may be restricted by suitable stop members mounted in the cross bar 61, and for this purpose, I prefer to employ two screws 91 and 92 extending into the opposite ends of the cross bar 61 and threadedly engaged therewith, and two compression springs 94 and 95 mounted between the screws 91 and 92 and the adjacent ends of the heads 63a and 64a, respectively, Fig. 1. With this construction, the legs 63 and 64 are yieldingly held in position between the springs 94 and 87, and springs 95 and 88, respectively, the position being determined by the adjustment of the screws 91 and 92.

The intermediate leg 66, Figs. 1 and 3, embodies an adjusting screw 97 which extends through the longitudinal center portion of the cross bar 61 and is threadedly engaged in a nut 98 journalled on the center portion of the cross bar 61 by a suitable clamp 99. A ring 101 is mounted on the lower end portion of the screw 97 by suitable means such as, for example, welding and is of such internal diameter as to fit snugly but with a sliding fit on the sleeve 51 to which the nose piece 49 is attached. When the auxiliary frame 26 is to be mounted on the trial frame 22 the screw 97 of the center leg 96 is adjusted by rotating the end 98 to dispose the ring 101 in such position that when the clips 81 and 82 are disposed on the cross member 31 of the trial frame 22 the ring 101 slips inwardly over the sleeve 51. A set screw 103 is mounted in the lower portion of the ring 101, Figs. 1 and 3, and may be tightened into clamping engagement with the sleeve 51 to releasably secure the auxiliary frame 26 in proper position on the trial frame 22.

The disk 74 of the lens-mount 69, Figs. 1, 5 and 6, is substantially circular in shape and has a substantially circular shaped window 105 formed in the radial center thereof. The window 105 is shown in the drawings as comprising merely an opening or aperture but it will be appreciated that such a window could comprise an opening closed by a clear lens or glass having no corrections therein and, therefore, it will be appreciated that the term "window" as used herein includes an unrestricted opening or aperture or an opening having such a glass mounted therein. A similar window 104 is afforded in the center of the disk 74.

As is best seen in Figs. 6 and 7, the housing 72 includes a peripheral rim 72a and a radially inwardly projecting flange 72b forming an inner or rear wall member of the housing 72, and the disk 74 is mounted in the rim 72a of the housing 72 in juxtaposition to the flange 72b. The disk 74 is mounted in the peripheral flange 72a of the housing 72 with a relatively snug but sliding fit, and may be releasably secured in this assembled position by suitable means such as set screws 107 threaded into the flange 72a in such position that the heads thereof overlie the forward face of the disk 74.

Radially outwardly of the window 105, but radially inwardly of the peripheral edge of the disk 74, a plurality of auxiliary lenses 25a are mounted in the disk 74 in spaced relation therearound. In the disk 74 shown in the drawings, it will be noted that ten of such auxiliary lenses 25a are mounted therein, but it will be appreciated by those skilled in the art that a greater or lesser number of such lenses may be mounted in the disk 74 without departing from the purview of my invention.

The lenses 25a are so disposed in the disk 74 that when the lens-mount 69 is disposed in proper position on the trial frame 22, the lowermost auxiliary lens 25a is disposed in proper position forwardly of the corrective lens 25 so that a patient looking through the lens 25 in reading or intermediate direction looks through the lens 25 and, also, the aforementioned lowermost auxiliary lens 25a.

The disk 74 is rotatable in the housing 72 by means of a handle 109 projecting from the front face thereof, Figs. 1, 2 and 6, and for assuring the proper positioning or indexing of the disk 74 during rotation thereof, suitable stop mechanism is provided in the housing 72 and the disk 74. This stop mechanism includes a steel ball 112 mounted in a boss 114 which projects radially outwardly from the housing 72, Figs. 1 and 5. The ball 112 is urged radially inwardly into engagement with the periphery of the disk 74 by a compression spring 116 mounted in the boss 114. A plurality of indentations or recesses 118 are formed in the peripheral face of the disk 74, Figs. 5 and 6, in such position that during a complete rotation of the disk 74 in the housing 72 the ball 112 moves into and out of each of the recesses 118. The recesses 118 are so spaced around the periphery of the disk 74 that when the ball 112 is disposed in one of the recesses, one of the auxiliary lenses 25a is disposed in proper lowermost position in the housing 72.

Thus it will be seen that to bring any one of the lenses 25a into the proper position in the housing 72 it is merely necessary for the operator to turn the handle 109 and thereby rotate the disk 74 into the position wherein the proper auxiliary lens 25a is disposed in lowermost position and the ball 112 snaps into the corresponding recess 118. The ball 112 and the recesses 118 are substantially complementary in shape and are close fitting so that they afford an accurate indexing medium for assuring proper positioning of the disk 74.

The various individual auxiliary lenses 24a and 25a in the disks 24 and 25 may comprise a combination bifocal lens B and trifocal lens T, or just one of such lenses such as a bifocal lens B' as shown in Figs. 1 and 5 of the drawings. Where a trifocal lens T and a bifocal lens B are combined to afford a single auxiliary lens 24a or 25a, the trifocal lens T is preferably mounted radially inwardly of the bifocal lens B. When a single lens, such as a bifocal lens B', forms an individual auxiliary lens 24a or 25a, it preferably fills the entire aperture as shown in Figs. 1 and 5. It will be seen that, with this arrangement, several disks 73 and 74 may be made available to a person examining eyes, each of the disks having a different combination of bifocal and trifocal lenses so that the proper bifocal or trifocal lens for a patient's eye may be readily disposed in proper position in my novel device.

The lens-mount 68 is of the same construction as the lens-mount 69 but is a reverse or mirror-image thereof, and, therefore, need not be discussed in detail, it being sufficient to say that the disk 73 may be rotated in the housing 71 by means of the handle 119 and is indexed by a stop mechanism including a ball, not shown, mounted in the boss 120, Fig. 1, in the same manner previously discussed with respect to the lens mount 69.

Two stop fingers 121 and 122, Figs. 2, 7, and 9, are mounted on the channels 76 and 77 of the lens-mounts 68 and 69 and are so disposed that, when the legs 63 and 64 are disposed in position to mount the lens-mounts 68 and 69 in proper operative position relative to the lenses 24 and 25, the stop fingers 121 and 122 are engaged with the housings 33 and 34, respectively, on the trial frame 22 to thereby stop the outward movement of the legs 63 and 64 by the springs 87 and 88 in proper position. With this construction it will be seen that an operator may grasp the auxiliary frame 26 with the legs 63 and 64 disposed between his fingers and press the legs 63 and 64 inwardly toward each other and then move the auxiliary frame rearwardly into the position wherein the spring clips 81 and 82 are mounted on the cross bar 31 and the ring 101 is mounted on the sleeve 51 of the trial frame 22 and when the operator releases his finger grip on the legs 63 and 64 the latter are automatically moved outwardly by the springs 87 and 88 into proper position relative to the lenses 24 and 25 in which position the stop fingers 121 and 122 engage the housings 33 and 34, respectively, and automatically stop further outward movement of the lens-mounts 68 and 69.

Hence, it will be seen that in the operation of my novel invention, the trial frame 22 may be adjusted to support corrective lenses such as lenses 24 and 25 in proper spectacle-position on a patient. The lens-mounts 68 and 69 may then be readily clipped onto the cross member 31 of the trial frame 22 and are automatically adjusted thereon by the springs 87 and 88 into proper position to support the lowermost auxiliary lens 24a and 25a in proper operative position relative to the corrective lenses 24 and 25. The set screw 103 may then be tightened on the sleeve 51 to releasably secure the trial frame 26 and the lens-mounts 68 and 69 against accidental dislodgement from the trial frame 22. Thereafter, the operator may turn the disks 73 and 74 in the housings 71 and 72, respectively, to properly position the selected bifocal or trifocal auxiliary lenses 24a and 25a in the aforementioned lowermost positions wherein the patient may look through the corrective lenses 24 and 25 and the properly positioned auxiliary lenses 24a and 25a in the same manner that he would look through spectacles embodying compound lenses, to thereby demonstrate to the patient the affect of wearing bifocal or trifocal spectacles. Also, if desired, the operator may quickly and easily remove either the disk 73 or the disk 74 and replace the same with a different disk 73 and 74, by merely taking out the set screw 107 from the housing 71 or 72, lifting the corresponding disk 73 or 74 forwardly out of its housing, inserting a new disk 73 or 74 in the housing 71 or 72 and again inserting the set screw 107.

From the foregoing it will be seen that I have afforded a novel optometrical apparatus by which the advantages and affect of bifocal and trifocal spectacles may be readily and effectively demonstrated to persons having their eyes examined, and which is practical and efficient in operation, is easily operated, and may be efficiently and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. An optometrical device, adapted to be mounted upon a trial frame of the kind including a cross member and a pair of lens housings for supporting corrective lenses and mounted on said cross member in spaced relation to each other, and adapted to be used with said trial frame in demonstrating the use of bifocal and trifocal lenses, said device comprising: an elongated cross bar; means for mounting said cross bar in adjustably fixed vertical position relative to said cross member of said trial frame; a pair of auxiliary lens mounts each including a window and means for mounting an auxiliary lens adjacent said window; guide means, comprising a pair of guide members mounted on said cross bar for longitudinal movement with respect thereto and projecting from said cross bar into engagement with said auxiliary lens mounts, for maintaining said auxiliary lens mounts in predetermined vertical angular alignment with respect to said cross bar; biasing means urging said guide members and said auxiliary lens mounts outwardly toward the ends of said cross bar; means for engaging said trial frame cross member and said auxiliary lens mounts to maintain said auxiliary lens mounts in predetermined vertical position relative to said lens housings; and stop means on said auxiliary lens mounts for engaging said trial frame to limit outward movement of said auxiliary lens mounts and to align said auxiliary lens mounts with said trial frame lens housings to permit a user to look through said corrective lenses and said windows in a normal distance-looking direction and through said corrective and auxiliary lenses in a normal reading or intermediate direction.

2. An optometrical device, adapted to be mounted upon a trial frame of the kind including a cross member and a pair of lens housings for supporting corrective lenses and mounted on said cross member in spaced relation to each other, and adapted to be used with said trial frame in demonstrating the use of bifocal and trifocal lenses, said device comprising: an elongated cross bar; means for mounting said cross bar in adjustably fixed vertical position relative to said cross member of said trial frame; a pair of auxiliary lens mounts each including a guide element, a window, and means for mounting an auxiliary lens adjacent said window; guide means, comprising a pair of guide members mounted on said cross bar for longitudinal movement with respect thereto and projecting from said cross bar into engagement with said auxiliary lens mount guide elements, for maintaining said auxiliary lens mounts in predetermined vertical angular alignment with respect to said cross bar; biasing means urging said guide members outwardly toward the ends of said cross bar; clamp means, comprising a pair of spring clamps individually mounted on said auxiliary lens mounts, for engaging said trial frame cross member to maintain said auxiliary lens mounts in predetermined vertical position relative to said lens housings; and stop means, mounted on said auxiliary lens mounts, for engaging said trial frame lens housings to limit outward movement of said auxiliary lens mounts and to align said auxiliary lens mounts with said trial frame lens housings to permit a user to look through said corrective lenses and said windows in a normal distance-looking direction and through said corrective and auxiliary lenses in a normal reading or intermediate direction.

3. An optometrical device, adapted to be mounted upon a trial frame of the kind including a cross member, a nose piece mounted on said cross member, and a pair of lens housings for supporting corrective lenses and mounted on said cross member in spaced relation to each other, and adapted to be used with said trial frame in demonstrating the use of bifocal and trifocal lenses, said device comprising: an elongated cross bar; means for mounting said cross bar in adjustably fixed vertical position relative to said cross member of said trial frame, said means comprising a mounting member for engaging the nose piece of said trial frame and a locking member for locking said mounting member in fixed position thereon; a pair of auxiliary lens mounts each including a window and means for mounting an auxiliary lens adjacent said window; guide means, comprising a pair of guide members mounted on said cross bar for longitudinal movement with respect thereto and projecting from said cross bar into engagement with said auxiliary lens mounts, for maintaining said auxiliary lens mounts in predetermined vertical angular alignment with respect to said cross bar; biasing means urging said guide members outwardly toward the ends of said cross bar; means for engaging said trial frame cross member and said auxiliary lens mounts to maintain said auxiliary lens mounts in predetermined vertical position relative to said lens housings; and stop means on said auxiliary lens mounts for engaging said trial frame to limit outward movement of said auxiliary lens mounts and to align said auxiliary lens mounts with said trial frame lens housings to permit a user to look through said corrective lenses and said window in a normal distance-looking direction and through said corrective and auxiliary lenses in a normal reading or intermediate direction.

4. An optometrical device, adapted to be mounted upon a trial frame of the kind including a cross member and a pair of lens housings for supporting corrective lenses and mounted on said cross member in spaced relation to each other, and adapted to be used with said trial frame in demonstrating the use of bifocal and trifocal lenses, said device comprising: an elongated cross bar substantially tubular having a pair of guide slots adjacent the ends thereof; means for mounting said cross bar in adjustably fixed vertical position relative to said cross member of said trial frame; a pair of auxiliary lens mounts each including a guide element, a window, and means for mounting an auxiliary lens adjacent said window; guide means, comprising a pair of guide members mounted within said cross bar and extending through said slots for longitudinal movement with respect to said cross bar and projecting from said cross bar into engagement with said auxiliary lens mount guide elements, for maintaining said auxiliary lens mounts in predetermined vertical angular alignment wtih respect to said cross bar; biasing means, comprising a pair of compression springs disposed within said cross bar and individually engaging said cross bar and one of said guide members, for urging said guide members outwardly toward the ends of said cross bar; clamp means, mounted on said auxiliary lens mounts, for releasably engaging said trail frame cross member to maintain said auxiliary lens mounts in predetermined vertical position relative to said lens housings; and stop means on said auxiliary lens mounts for engaging said trial frame to limit outward movement of said auxiliary lens mounts and to align said auxiliary lens mounts with said trial frame lens housings to permit a user to look through said corrective lenses and said windows in a normal distance-looking direction and through said corrective and auxiliary lenses in a normal reading or intermediate direction.

5. An optometrical device, adapted to be mounted upon a trial frame of the kind including a cross member and a pair of lens housings for supporting corrective lenses and mounted on said cross member in spaced relation to each other, and adapted to be used with said trial frame in demonstrating the use of bifocal and trifocal lenses, said device comprising: an elongated cross bar; means for mounting said cross bar in adjustably fixed vertical position relative to said cross member of said trial frame; a pair of auxiliary lens mounts each including a window, means for mounting a plurality of auxiliary lenses in annular encompassing relation adjacent to said window, means for adjusting said mount to bring any desired one of said auxiliary lenses into a predetermined operating position adjacent the bottom edge of said window, and a detent for maintaining said mount in adjusted position; guide means, comprising a pair of guide members mounted on said cross bar for longitudinal movement with respect thereto and projecting from said cross bar into engagement with said auxiliary lens mounts, for maintaining said auxiliary lens mounts in predetermined vertical angular alignment with respect to said cross bar; biasing means urging said guide members outwardly toward the ends of said cross bar; means, mounted on said auxiliary lens mounts, for engaging said trial frame cross member to maintain said auxiliary lens mounts in predetermined vertical position relative to said lens housings; and stop means on said auxiliary lens mounts for engaging said trial frame lens housings to limit outward movement of said auxiliary lens mounts and to align said auxiliary lens mounts with said trial frame lens housings to permit a user to look through said corrective lenses and said window in a normal distance-looking direction and through said corrective lens and said one auxiliary lens in a normal reading or intermediate direction.

References Cited in the file of this patent

UNITED STATES PATENTS

| | | |
|---|---|---|
| 997,289 | Hamilton | July 11, 1911 |
| 1,471,996 | Bailey | Oct. 23, 1923 |
| 1,585,489 | Hailman | May 18, 1926 |
| 1,804,691 | Hunsicker | May 12, 1931 |
| 2,103,340 | Schneck | Dec. 28, 1937 |
| 2,545,673 | Pozarik | Mar. 20, 1951 |